(12) United States Patent
Kim et al.

(10) Patent No.: US 10,139,307 B2
(45) Date of Patent: Nov. 27, 2018

(54) SAFETY INSPECTION APPARATUS FOR BRIDGE USING EXPANSION JOINT WITH LOAD CELL AND METHOD FOR THE SAME

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Jong Sup Park, Gyeonggi-do (KR)

(73) Assignee: KOREA INSTITUTE OF CIVIL ENGINEERING AND BUILDING TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 15/820,448

(22) Filed: Nov. 22, 2017

(65) Prior Publication Data

US 2018/0149554 A1    May 31, 2018

(30) Foreign Application Priority Data

Nov. 29, 2016   (KR) .......................... 10-2016-0159837

(51) Int. Cl.
*G01G 19/00*    (2006.01)
*G01M 5/00*    (2006.01)
(Continued)

(52) U.S. Cl.
CPC ........ *G01M 5/0008* (2013.01); *G01G 19/024* (2013.01); *G01G 19/035* (2013.01);
(Continued)

(58) Field of Classification Search
CPC . G01M 5/0008; G01G 19/024; G01G 19/035; G01G 19/62; G01G 19/021; E01D 19/06
(Continued)

(56) References Cited

U.S. PATENT DOCUMENTS 6,240,783 B1 *  6/2001  McGugin ................. G01H 9/00
                                                          73/579
8,955,386 B2     2/2015  Petschacher
(Continued)

FOREIGN PATENT DOCUMENTS

JP        2005-030786       2/2005
JP          5164100         3/2013
(Continued)

*Primary Examiner* — Max Noori
(74) *Attorney, Agent, or Firm* — JCIPRNET

(57) ABSTRACT

Provided is a safety inspection apparatus for a bridge using an expansion joint with a load cell capable of inspecting safety of a bridge and checking an overweight of a traveling vehicle by including a load cell installed at a lower portion of an expansion joint installed between upper plates of a bridge to measure a load of a traveling vehicle, and a measuring device installed on the bridge to measure behavior of the bridge, determining a total weight of a vehicle to manage an operation of an overweight vehicle which hinders safety of a structure and road pavement, measuring and storing weight data of a vehicle passing over the bridge as behavior data of the bridge in real time, and determining performance, a degree of deterioration, and a damaged position of the bridge without a separate safety inspection by analyzing the data over the long term.

12 Claims, 11 Drawing Sheets

(51) Int. Cl.
*G01G 19/02* (2006.01)
*G01G 19/03* (2006.01)
*G01G 19/62* (2006.01)
*E01D 19/06* (2006.01)
*G01G 19/06* (2006.01)

(52) U.S. Cl.
CPC ............. *G01G 19/62* (2013.01); *E01D 19/06* (2013.01); *G01G 19/06* (2013.01)

(58) Field of Classification Search
USPC .......................................................... 73/786
See application file for complete search history.

(56) References Cited

U.S. PATENT DOCUMENTS

| | | | | |
|---|---|---|---|---|
| 9,417,154 B2* | 8/2016 | Muncy | ................ | G01M 5/0008 |
| 2010/0242609 A1* | 9/2010 | Lee | .................... | G01M 5/0008 |
| | | | | 73/594 |
| 2012/0089378 A1* | 4/2012 | Lee | ......................... | G01M 5/00 |
| | | | | 703/2 |
| 2015/0198502 A1* | 7/2015 | Phares | ................ | G01M 5/0066 |
| | | | | 702/42 |
| 2015/0226633 A1* | 8/2015 | Greimann | ........... | G01M 5/0008 |
| | | | | 73/786 |
| 2017/0160165 A1* | 6/2017 | Moon | ..................... | G01M 7/08 |
| 2018/0224352 A1* | 8/2018 | Zhang | ..................... | G01H 1/14 |

FOREIGN PATENT DOCUMENTS

| | | |
|---|---|---|
| JP | 2013-174481 | 9/2013 |
| KR | 10-0473480 | 2/2005 |
| KR | 10-0724304 | 5/2007 |
| KR | 10-0787474 | 12/2007 |
| KR | 10-0917658 | 9/2009 |
| KR | 10-2010-0026917 | 3/2010 |
| KR | 10-1487760 | 1/2015 |

* cited by examiner

| VEHICLE CLASS | VEHICLE TYPE | | VEHICLE BODY | AXLE ARRANGEMENT |
|---|---|---|---|---|
| P-TYPE | 1 | PASSENGER VEHICLE, MINI TRUCK | | |
| B-TYPE | 2 | BUS | | |
| T-TYPE | 3 | SMALL CARGO VEHICLE A | | |
| | 4 | SMALL CARGO VEHICLE B | | |
| TT-TYPE | 5 | MEDIUM CARGO VEHICLE A | | |
| | 6 | MEDIUM CARGO VEHICLE B | | |
| | 7 | MEDIUM CARGO VEHICLE C | | |
| ST-TYPE | 8 | LARGE CARGO VEHICLE A | | |
| | 9 | LARGE CARGO VEHICLE B | | |
| | 10 | LARGE CARGO VEHICLE C | | |
| | 11 | LARGE CARGO VEHICLE D | | |
| | 12 | LARGE CARGO VEHICLE E | | |

FIG. 8

SAFETY INSPECTION APPARATUS FOR BRIDGE USING EXPANSION JOINT WITH LOAD CELL AND METHOD FOR THE SAME

CROSS-REFERENCE TO RELATED APPLICATION

This application claims priority to and the benefit of Korean Patent Application No. 10-2016-0159837, filed on Nov. 29, 2016, the disclosure of which is incorporated herein by reference in its entirety.

BACKGROUND

1. Field of the Invention

The present invention relates to a safety inspection apparatus for a bridge using an expansion joint with a load cell and, more specifically, to a safety inspection apparatus for a bridge using an expansion joint with a load cell capable of checking an overweight of a traveling vehicle and inspecting safety of a bridge in real time by including a load cell installed at a lower portion of an expansion joint installed between upper plates of the bridge to measure a load of the traveling vehicle, and a method thereof.

2. Discussion of Related Art

Generally, a bridge is divided into an upper structure and a lower structure, and the upper structure is affected by expansion generated due to loading of a load, a temperature change, concrete creep, dry shrinking, a natural disaster, pre-stressing, and the like. An upper plate of the bridge is cut to a predetermined length and is typically installed with an expansion gap of 20 to 30 mm between unit sections thereof to allow the upper structure to easily expand.

When rainwater percolates through the gap between the unit sections or a foreign material, such as soil or the like, is interposed therebetween, an expansion action in a unit concrete section is hindered. Particularly, when a deicing agent, such as calcium chloride, is spread on a road in the winter to melt snow, the snow melt water is introduced through the gap, corrodes the bridge, and runs down the bridge to dirty an exterior of the bridge.

Also, a discontinuous portion is formed by the expansion gap, and the discontinuous portion is an obstacle to traveling of a vehicle, and thus an expansion joint is installed in the discontinuous portion of the bridge.

FIG. 1 is a view showing a bridge with an expansion joint section according to a related art.

Specifically, as shown in FIG. 1, a bridge 10 includes abutments 11 installed at both sides thereof; piers 12 installed between the abutments 11 at regular distances; a girder 14 horizontally installed on a support 13 installed at a point at which the girder 14 meets the abutment 11 or the pier 12; and upper plates 15 connected with each other in a longitudinal direction of the bridge by an expansion joint formed at both ends or one side of an upper portion of the girder 14 to flexibly adapt to a length change caused by a temperature change. In this case, a portion shown with reference symbol A in which the upper plate 15 faces the abutment 11 and a block out space shown with reference symbol B from which a part of an end portion of each of the upper plates 15 is removed are formed so that the expansion joints are formed therein.

As shown in FIG. 1, the expansion joint of the bridge 10 according to the related art connects the upper plates 15 between the upper plates, and post-casting part concrete 17 is poured in the block out space as a burying material for installing the expansion joint.

The expansion joint for a bridge, for example, includes a rubber product including a monocell type joint, a transflex joint, and the like, and a steel product including a Freyssinet type joint, a steel finger type joint, a rail-type joint, and the like.

FIGS. 2A and 2B are views showing an expansion joint member installed in an expansion joint section between upper plates of a bridge according to a related art, wherein FIG. 2A is a plan view, and FIG. 2B is a side view.

As shown in FIG. 2A, most of the upper plate 15 of the bridge forms a paving section covered with an asphalt concrete layer, the post-casting part concrete 17 is poured in the block out space to form a connection section, and an expansion joint member 18 with a finger part 18a expands toward an outside of a space between the upper plates 15 disposed at regular distances to cover the gap between the upper plates 15 and form the expansion joint section.

The finger part 18a is on the same level as a road surface of the bridge, and thus the road surface of the bridge is wholly uniformly maintained despite the gap between the upper plates 15, and uneven portions formed by finger parts 18a of adjacent expansion joint members 18 are engaged with each other to prevent a wheel of a traveling vehicle from getting stuck in the gap between the upper plates 15.

In this case, a length of the uneven portion of the finger part 18a is formed to correspond to a length of seasonal thermal expansion of the upper plates 15. For example, even though the engaging portion between the uneven portions is long due to expansion of the upper plates 15 in a hot summer, the upper plates still have a small gap G between a depression and a protrusion thereof, and protrusions of adjacent expansion joints between the upper plates 15 are engaged in a predetermined section even in a cold winter to determine the length of the uneven portion so that the gap is not exposed.

As shown in FIG. 2B, the expansion joint for a bridge includes the expansion joint member 18 installed at a required position in a removed portion formed at an upper end thereof in a longitudinal direction of an upper plate, which is a traveling direction of a traveling vehicle, that is, a block out space, then the post-casting part concrete 17 is poured into a site and cured to assemble a mold and a reinforced bar.

The expansion joint member 18 has an anchor 19a attached to a rear surface thereof such that the anchor 19a is fixed to a reinforced bar 19b exposed from the upper plate 15, and then the post-casting part concrete 17 is poured on one side of the expansion joint member 18 such that the expansion joint member 18 is integrated with the upper plate 15. In this case, a part of the body of the expansion joint member 18, such as the anchor 19a, is buried and fixed in the post-casting part concrete 17.

Meanwhile, a road pavement and a bridge are designed and constructed in consideration of a design load applied by loads of passing vehicles. When a vehicle exceeding the design load passes over the bridge, the bridge may be damaged such that the road pavement needs to be maintained, and particularly, a lifetime of the bridge constructed to have a designed lifetime of 75 years or more may be shortened.

Therefore, the road management authority limits a limit load of a passing vehicle on a road to a total weight of 40 tons and an axle weight of 10 tons as defined in a road act and checks a vehicle exceeding the limit load as an overweight vehicle. An overweight check method is mainly divided into a method using a fixed weighing machine and a method using a movable weighing machine and, for example, the method using a fixed weighing machine determines whether a vehicle is overweight using a fixed weighing machine at an overweight check point installed at a predetermined point of a road, and the method using a movable weighing machine randomly determines whether a vehicle is overweight using a movable weighing machine at a random point.

FIGS. 3A and 3B are installation views of movable and fixed apparatuses for measuring a vehicle weight used to check an overweight according to a related art, and the apparatuses distinguish an overweight vehicle and check a speed of a vehicle by measuring a weight of each vehicle.

As shown in FIG. 3A, a movable vehicle weight measuring device 20 is easily used but has a problem in requiring a long time for use, for example a vehicle should be moved to the vehicle weight measuring device 20 to measure whether the vehicle is overweight. Particularly, the vehicle weight measuring device 20 has problems in which an accident, such as a traffic accident, may be generated when a vehicle that drives at a high speed is guided and stopped and excessive costs are directly and indirectly required to distinguish whether the vehicle is overweight.

Further, as shown in FIG. 3B, a fixed vehicle weight measuring device 30 includes a control box 32 and a display device 33 installed in a load cell 31 which is attached to a plate and with which a wheel of a vehicle comes into direct contact to measure a weight of the vehicle and distinguishes whether the vehicle is overweight. The method of measuring a weight of a vehicle using a fixed weighting machine allows the vehicle to slowly enter a position at which a plate is installed to measure a weight of the vehicle and allows the vehicle to be measured when the vehicle is stopped.

In other words, due to characteristics of a road and a heavy vehicle using the road, it is necessary to check for an overweight at various places, but the fixed vehicle weight measuring device involves excessive costs, such as costs for installing a separate check point on a road and operation costs, and thus the number of installed devices is limited. Also, the movable vehicle weight measuring device is inexpensive but has problems in that manpower and accidents are caused when measurement is performed on the road.

Thus, a device which is simply installed at most bridges to check safety of the bridge and easily checks for an overweight of a passing vehicle is required.

(Patent document 1) Korean Registered Patent No. 10-1487760 (Title: System for Checking Overweight Vehicle, filed on Aug. 26, 2014)

(Patent document 2) Korean Laid-open Patent Application No. 2010-26917 (Title: Bridge Having Expansion Joint and Method of Setting Expansion Joint, published on Mar. 10, 2010)

(Patent document 3) Korean Registered Patent No. 10-787474 (Title: Safety Inspection Apparatus for Expansion Joint on Bridge, filed on Aug. 28, 2007)

(Patent document 4) Korean Registered Patent No. 10-917658 (Title: Safety Inspection Device, filed on Mar. 9, 2009)

(Patent document 5) Korean Registered Patent No. 10-724304 (Title: Installation Structure of Safety Inspection Apparatus for Elasticity Connection Part of Bridge, filed on Oct. 17, 2006)

(Patent document 6) Japanese Unexamined Patent Application Publication No. 2005-30786 (Title: Method for Measuring Load and Weight of Axle Weight of Vehicle Passing Over Bridge and Apparatus Thereof, published on Feb. 3, 2005)

(Patent document 7) Korean Registered Patent No. 10-473480 (Title: Measure Apparatus for Safety Check-Up of Bridge, filed on Sep. 10, 2004)

(Patent document 8) Japanese Unexamined Patent Application Publication No. 2013-174481 (Title: System for Measuring Axle Weight of Vehicle and System for Detecting Bridge using the Same, published on Sep. 5. 2013)

(Patent document 9) Japanese Registered Patent No. 5164100 (Title: System for Monitoring Vehicle Passing Over Bridge, Method for Monitoring Vehicle Passing Over Bridge, and Computer Program, registered on Dec. 28, 2012)

SUMMARY OF THE INVENTION

The present invention is directed to a safety inspection apparatus for a bridge using an expansion joint with a load cell which inspects safety of a bridge and checks an overweight of a traveling vehicle by including a load cell installed at a lower portion of an expansion joint installed between upper plates of the bridge to measure a load of the traveling vehicle, and a measuring device installed on the bridge to measure behavior of the bridge.

In addition, the present invention is directed to a safety inspection apparatus for a bridge using an expansion joint with a load cell which automatically recognizes a total weight of a vehicle without separate a measurement to manage an operation of an overweight vehicle which hinders safety of a structure and road pavement.

Further, the present invention is directed to a safety inspection apparatus for a bridge using an expansion joint with a load cell which measures and stores weight data of a vehicle actually passing over a bridge as behavior data of the bridge in real time and easily recognizes a performance, a degree of degradation, and a damaged position of the bridge without a separate safety inspection by analyzing the data over the long term.

According to an aspect of the present invention, there is provided a safety inspection apparatus for a bridge using an expansion joint with a load cell which includes an expansion joint including a machine part and a post-casting part installed in a expansion section between upper plates of a bridge, wherein a machine part-upper plate of the machine part has one side connected with an embedded anchor embedded in post-casting part concrete of the post-casting part by a rotatable hinge and the other side formed as a free end, at least one load cell provided at a lower end of the free end of the machine part-upper plate and configured to measure an axle weight and a total weight of a traveling vehicle when the traveling vehicle is placed on the machine part-upper plate, at least one measuring device installed at a predetermined position of the bridge and configured to measure behavior of the bridge when the traveling vehicle passes over the expansion joint, a manager terminal which includes a program to analyze the behavior of the bridge according to a load and is configured to check an overweight of the traveling vehicle and inspect safety of the bridge, and an image capturing device for checking an overweight configured to capture an image of the traveling vehicle to check whether the travelling vehicle is overweight.

The safety inspection apparatus for a bridge using an expansion joint with a load cell may further include an overweight vehicle check device installed at a predetermined position of the bridge and he configured to check the overweight of the traveling vehicle when the traveling vehicle is determined to be overweight based on data measured by the load cell.

The manager terminal may include a data collector which collects data measured by the load cell and the measuring device of the data collected by the data collector, a data processing and analyzing unit configured to calculate an axle weight, a distance between axles, and a vehicle speed based on the data measured by the load cell and calculate a bridge response performance according to the data measured by the measuring device, an overweight determination unit configured to determine whether the traveling vehicle is overweight by comparing the axle weight, the distance between axles, and the vehicle speed calculated by the data processing and analyzing unit with data stored in a vehicle information database (DB) in advance and determine whether the axle weight and the total weight of the traveling vehicle calculated by the data processing and analyzing unit exceeds an allowance, and a safety inspection unit configured to inspect safety of the bridge by setting the bridge response performance calculated by the data processing and analyzing unit and a determination result of the overweight determination unit in a bridge information DB by measurement items in advance and comparing the bridge response performance and the determination result with an installed behavior threshold value.

At least one expansion joint may be installed at the bridge, adjacent load cells may be configured to repeatedly measure the axle weight and indirectly calculate the axle weight, a distance between axles, and the vehicle speed of the traveling vehicle based on a difference of times at which loads are measured when the traveling vehicle moves in a bridge axis direction, and the manager terminal (240) may be configured to calculate the axle weight, the distance between axles, and the vehicle speed of the traveling vehicle according to the load time difference of the traveling vehicle.

The safety inspection apparatus for a bridge using an expansion joint with a load cell may be configured to, when the traveling vehicle passing the expansion joint is heavy, estimate data of the vehicle based on an axle weight, a distance between axles, and a vehicle speed of a heavy vehicle, measure the behavior of the bridge in real time when the traveling vehicle is loaded thereon, and inspect safety of the bridge using the measured result.

According to another aspect of the present invention, there is provided a safety inspection apparatus for a bridge using an expansion joint with a load cell which includes an expansion joint including a machine part and a post-casting part installed in an expansion joint section between upper plates of a bridge, wherein a rail-type expansion joint-upper plate of the machine part has one side connected to a machine part-upper plate by a rotatable hinge and a lower portion connected with an embedded anchor embedded in post-casting part concrete of a post-casting part, and the machine part-upper plate has one side connected to the rotatable hinge and the other side formed as a free end, at least one load cell provided at a lower end of the free end of the machine part-upper plate and configured to measure an axle weight and a total weight of a traveling weight when the traveling vehicle is placed on the machine part-upper plate, at least one measuring device installed at a predetermined position of the bridge and configured to measure behavior of the bridge when the traveling vehicle passes over the expansion joint, a manager terminal including a program to analyze the behavior of the bridge according to a load and configured to check an overweight of the traveling vehicle and inspect safety of the bridge, and an image capturing device for checking an overweight configured to capture an image of the traveling vehicle to check whether the traveling vehicle is overweight.

According to another aspect of the present invention, there is provided a safety inspection method of a bridge using an expansion joint with a load cell which includes a) an operation of allowing a traveling vehicle to enter a bridge installed with expansion joints at which a load cell is installed and to pass over the expansion joints, b) an operation of measuring, by the load cell, a load loaded on the load cell and including an axle weight and a distance between axles of the traveling vehicle, c) an operation of measuring, by a measuring device installed at a predetermined position of the bridge, behavior of the bridge after the traveling vehicle passes over the expansion joints, d) an operation of collecting, by a data collector of a manger terminal, data measured by the load cell and the measuring device, e) an operation of determining, by an overweight determination unit of the manager terminal, whether the traveling vehicle is overweight by comparing the data determined by the load cell with vehicle DB information stored in the manager terminal, f) an operation of capturing an image of the vehicle including a license plate of the vehicle to collect evidence when the vehicle is determined to be overweight, and g) an operation of inspecting, by the safety inspecting unit of the manager terminal, safety of the bridge according to the data collected by the load cell and the measuring device in real time, wherein the manger terminal includes a program to analyze behavior of the bridge according to a load and is configured to check an overweight of the traveling vehicle and inspect safety of the bridge.

When the traveling vehicle is determined to be overweight by the overweight determination unit of the manager terminal in operation f), an overweight vehicle check device may inspect the traveling vehicle.

BRIEF DESCRIPTION OF THE DRAWINGS

The above and other features of the present invention will become more apparent to those of ordinary skill in the art by describing exemplary embodiments thereof in detail with reference to the accompanying drawings, in which:

FIG. 8 is a view showing examples of vehicle type data applied to the safety inspection apparatus for a bridge using an expansion joint with a load cell according to the first embodiment of the present invention;

DETAILED DESCRIPTION OF EXEMPLARY EMBODIMENTS

Figure 1:
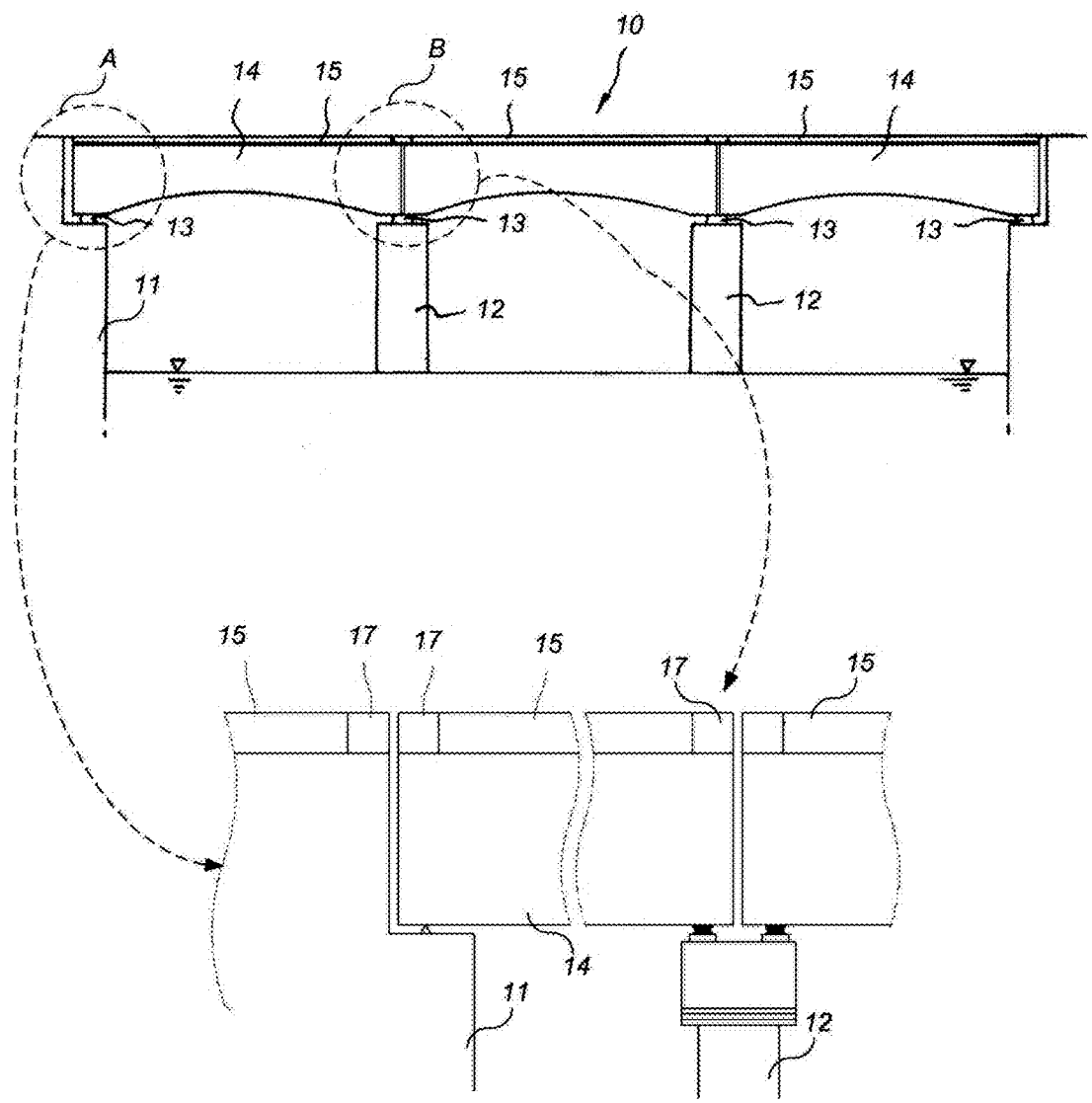
FIG. 1 is a view showing a bridge with an expansion joint section according to a related art.
Figure 2A:
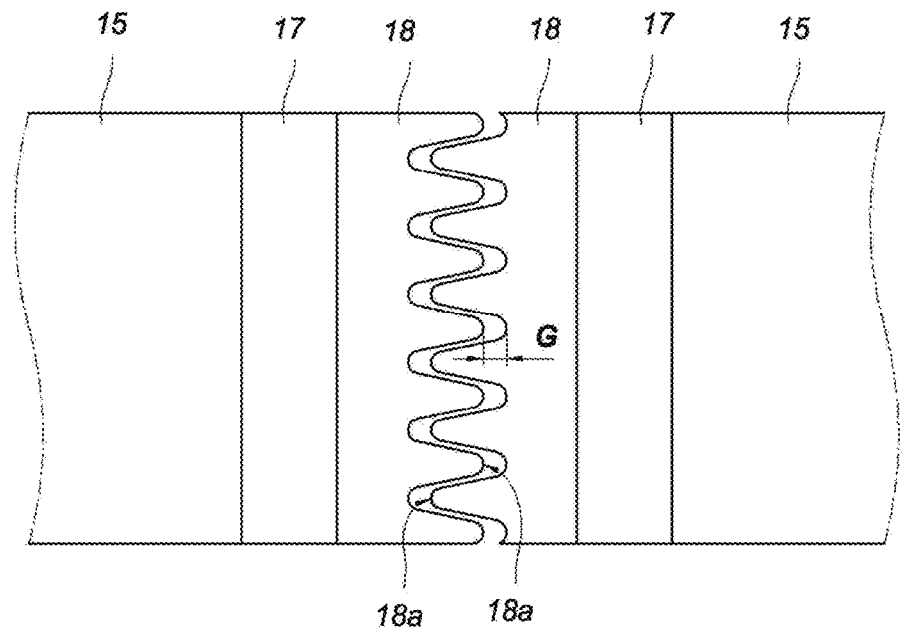
FIGS. 2A and 2B are views showing an expansion joint member installed in an expansion joint section between upper plates of a bridge according to a related art.
Figure 2B:
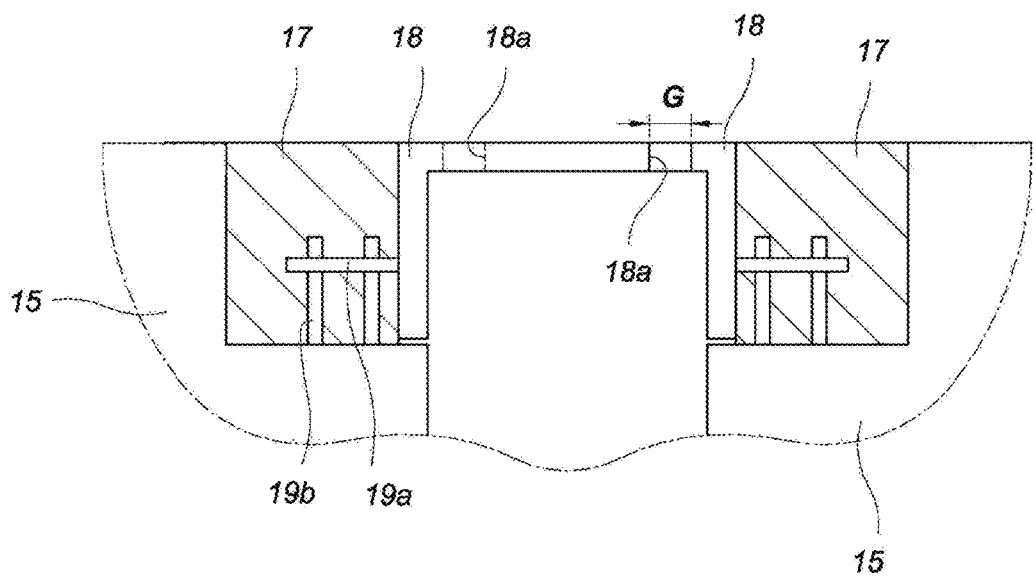
Figure 3A:
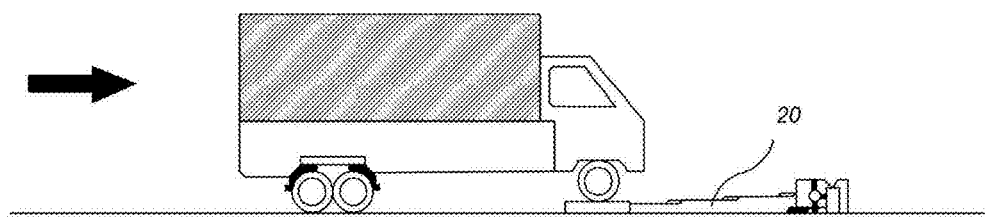
FIGS. 3A and 3B are installation views of movable and fixed apparatuses for measuring a vehicle weight used to check an overweight according to a related art.
Figure 3B:
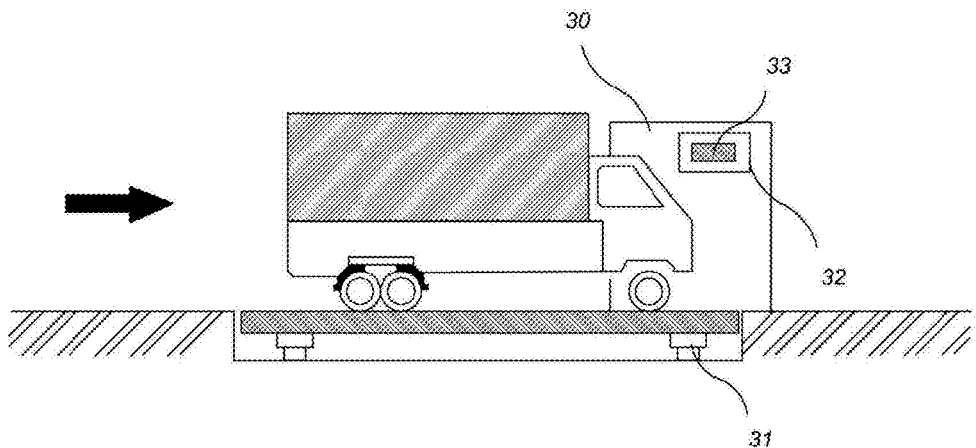

Hereinafter, embodiments of the present invention will be described in detail with reference to the accompanying drawings so that those skilled in the art may easily perform the embodiments. However, the embodiments of the present invention may be implemented in several different forms, and are not limited to the embodiments described herein. In addition, parts irrelevant to the description are omitted in the drawings to clearly explain the embodiments of the present invention. Similar parts are denoted by similar reference numerals throughout this specification.

Throughout the specification, when a portion "includes" an element, the existence of another element is not excluded and other elements may be further included, unless otherwise described.

First Embodiment: Safety Inspection Apparatus for a Bridge Using an Expansion Joint with a Load Cell FIG. 4 is a cross-sectional view schematically showing a safety inspection apparatus for a bridge using an expansion joint with a load cell according to one embodiment of the present invention.

Figure 4:
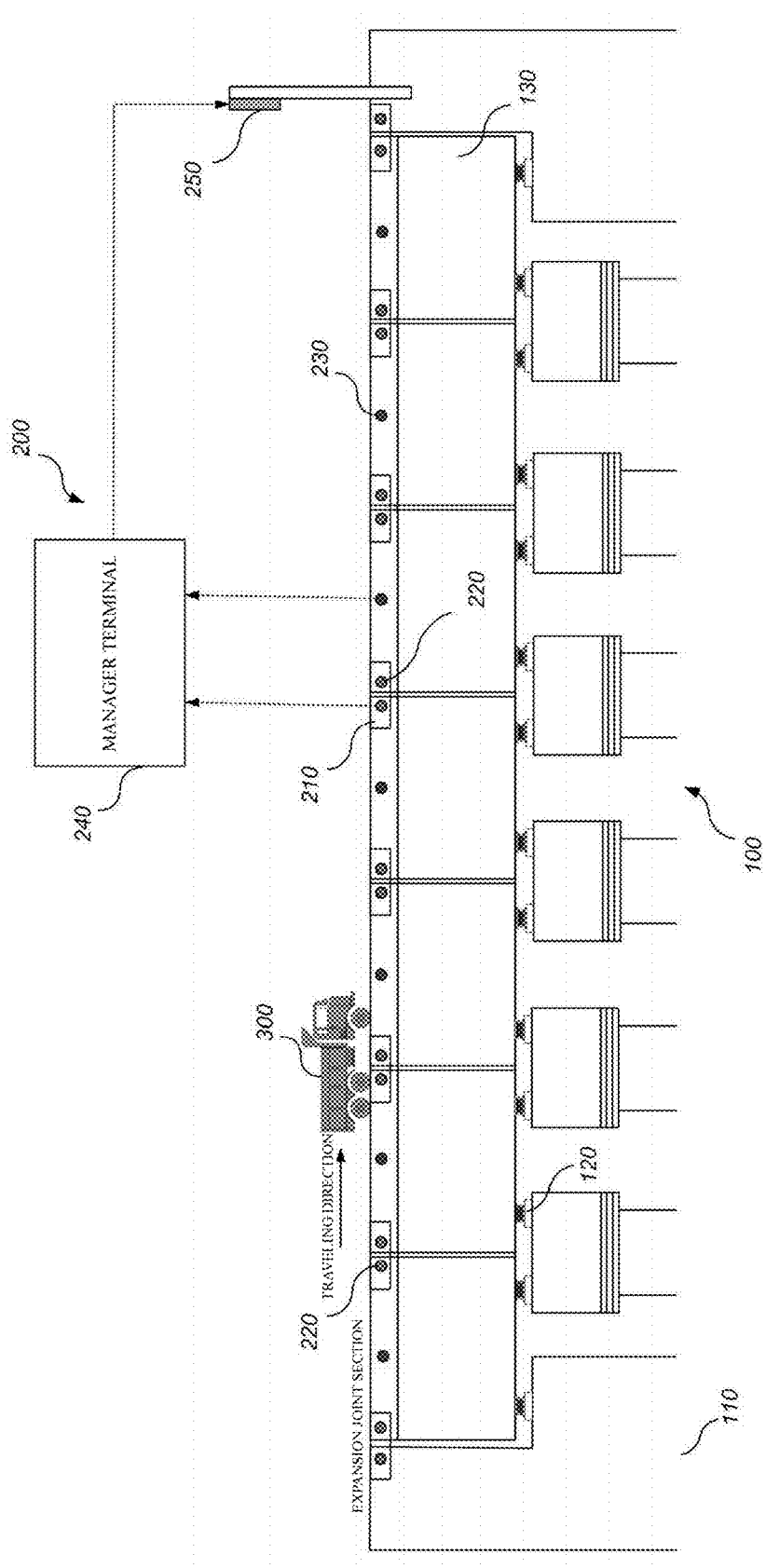
FIG. 4 is a cross-sectional view schematically showing a safety inspection apparatus for a bridge using an expansion joint with a load cell according to one embodiment of the present invention.

The safety inspection apparatus for a bridge using an expansion joint with a load cell according to the embodiment of the present invention, as shown in FIG. 4, includes an expansion joint 210, a load cell 220, a measuring device 230, a manager terminal 240, and an overweight vehicle check device 250. Herein, in the safety inspection apparatus for a bridge using an expansion joint with a load cell according to the embodiment of the present invention, only one expansion joint 210 with a plurality of load cells 220 may be provided per bridge, but when two expansion joints 210 are provided, an overweight inspection or a bridge safety inspection is accurately performed.

First, the load cells 220 which measure a load of a traveling vehicle 300 passing over the expansion joint 210 installed on a bridge 100 including an abutment/pier 110, a bridge seat 120, an upper plate or girder 130 of a bridge, and the like, are provided, and a measuring device 230, such as an accelerometer, a deformeter, a displacement gauge, a crackmeter, and the like, which measures behavior of the bridge 100 is installed at a predetermined position of the bridge 100, in this case, the measuring device 230 is connected with a computer with a program which analyzes the behavior of the bridge 100 caused by a load of the traveling vehicle 300 loaded thereon, for example, with the manager terminal 240.

Therefore, a safety inspection apparatus 200 for a bridge using an expansion joint with a load cell according to the embodiment of the present invention may inspect safety of the bridge 100 and check an overweight of the traveling vehicle 300 by allowing the installed load cells 220 to automatically measure an axle weight, a distance between axles, and a vehicle speed of the traveling vehicle 300. In this case, when the manager terminal 240 determines that the vehicle is overweight, the overweight vehicle check device 250 including an image capturing device (or image collecting device) which collets an image can check an overweight of the traveling vehicle 300.

Figure 5:
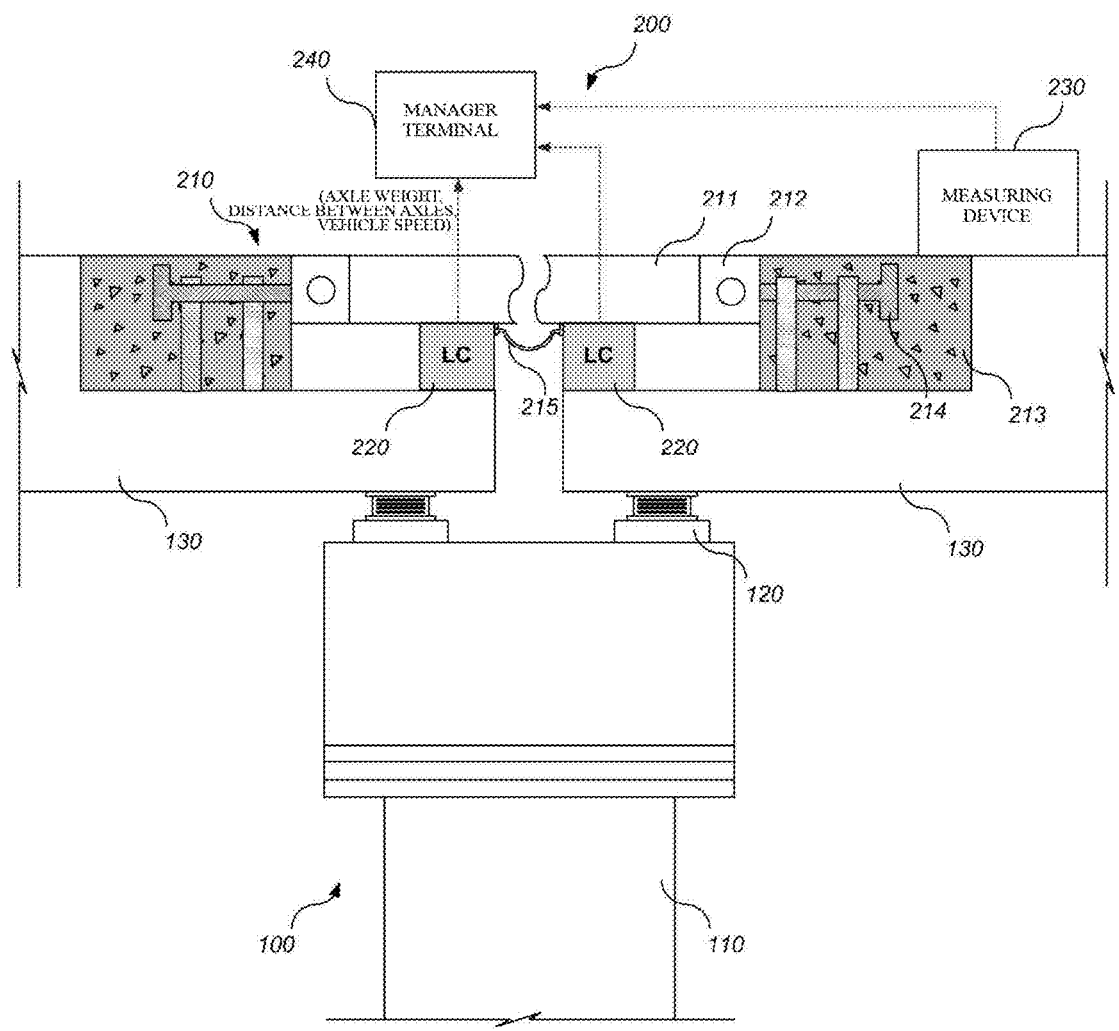
FIG. 5 is a side view of a safety inspection apparatus for a bridge using an expansion joint with a load cell according to a first embodiment of the present invention.
Figure 6:
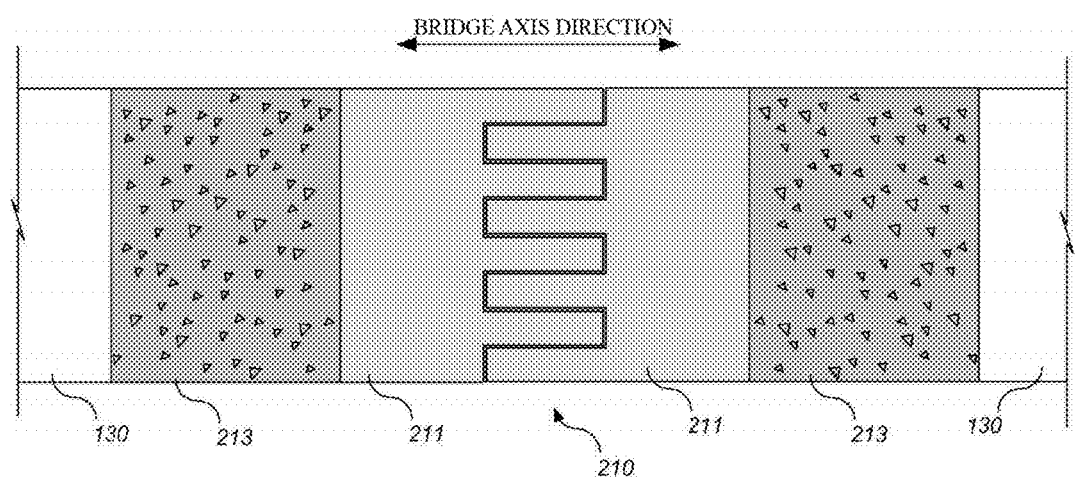
FIG. 6 is a plan view of the safety inspection apparatus for a bridge using an expansion joint with a load cell according to the first embodiment of the present invention.

FIG. 5 is a side view of the safety inspection apparatus for a bridge using an expansion joint with a load cell according to the first embodiment of the present invention, and FIG. 6 is a plan view of the safety inspection apparatus for a bridge using an expansion joint with a load cell according to the first embodiment of the present invention.

Figure 7:
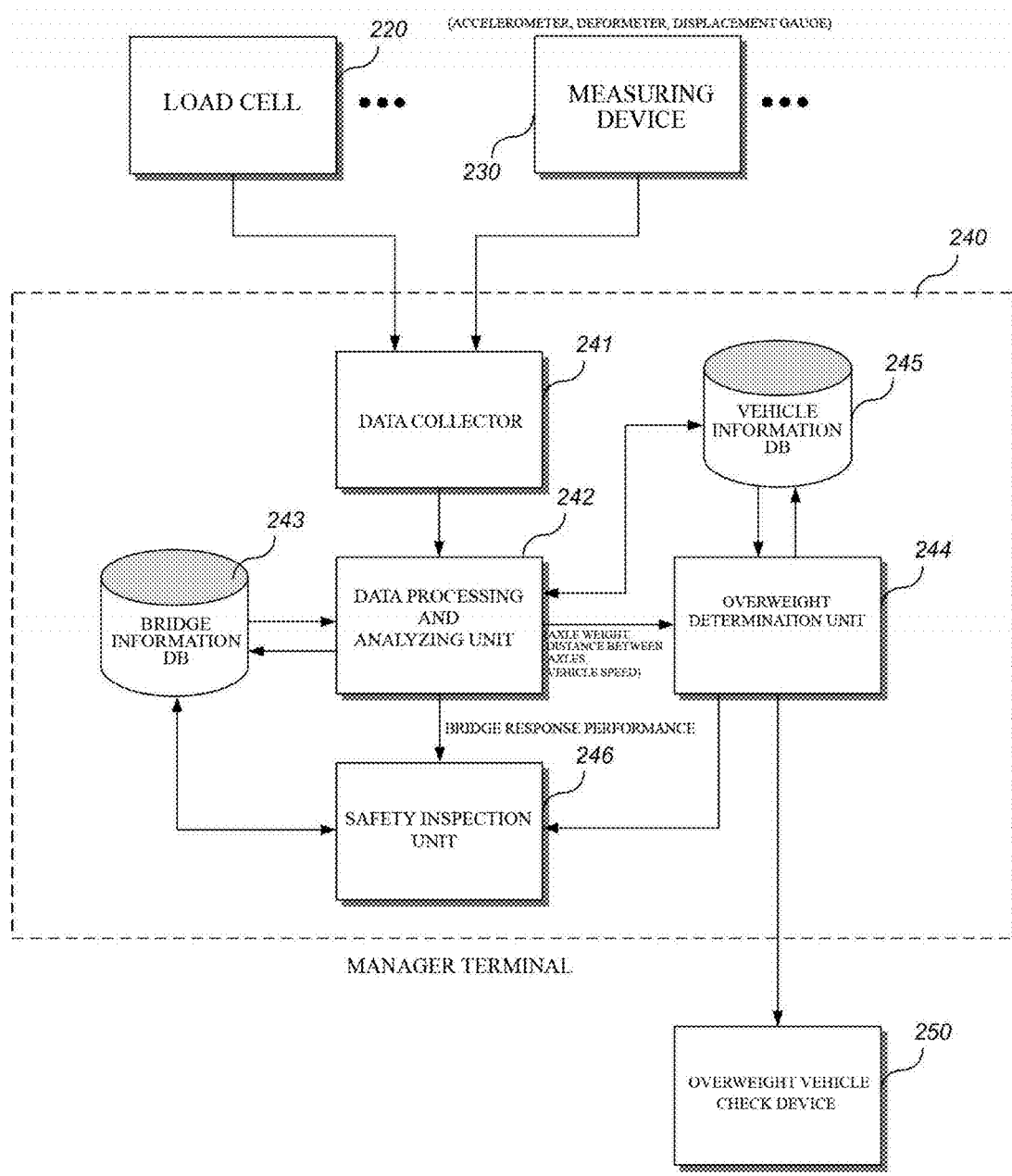
FIG. 7 is a view showing a detailed configuration of a manger terminal of the safety inspection apparatus for a bridge using an expansion joint with a load cell according to the first embodiment of the present invention.

Referring to FIGS. 5 and 6, the safety inspection apparatus for a bridge using an expansion joint with a load cell according to the first embodiment of the present invention includes a first expansion joint 210, the load cell 220, the measuring device 230, and the manager terminal 240, and may further include the overweight vehicle check device 250, as shown in FIG. 7 which will be described below.

First, as described above, the bridge 100 includes the abutment/pier 110, the bridge seat 120, the bridge upper plate 130 (or girder), and the like.

The first expansion joint 210 includes a machine part and a post-casting part installed in an expansion joint section of the bridge 100, and a machine part-upper plate 211 has one side connected to an anchor 214 embedded in post-casting part concrete 213 by a rotatable hinge 212 and the other side formed as a free end.

Particularly, the first expansion joint 210 is divided into the machine part and the post-casting part, is installed at the beginning and ends of the bridge 100, for example, between the abutment 110 and the bridge-upper plate 130 or between bridge-upper plates 130, and includes the load cell 220. In this case, the machine part includes the machine part-upper plate 211 and the hinge 212, and the post-casting part includes the post-casting part concrete 213 and the embedded anchor 214.

In this case, the machine part-upper plate 211 has one side connected to the embedded anchor 214 embedded in the post-casting part concrete 213 by the hinge 212, and the other side of the machine part-upper plate 211 is formed as a free end. In this case, each of the load cells 220 is provided or installed at a lower end of the free end, and the machine part-upper plate 211 is formed of a steel material. When the traveling vehicle 300 is placed on the machine part-upper plate 211, each of the load cells 220 measures the axle weight of the traveling vehicle 300 in real time. Also, a waterproofing plate 215 is installed under the expansion joint, and thus the first expansion joint blocks introduction of water and various foreign materials on a road into a space of the bridge to prevent concrete corrosion.

At least one load cell 220 is installed at a lower portion of the first expansion joint 210, automatically measures an axle weight, a distance between axles, and a speed of a vehicle, and is provided at the first expansion joint 210, that is, at a lower end of the free end of the machine part-upper plate 211, to measure the axle weight of the traveling vehicle 300 when the traveling vehicle 300 is placed on the machine part-upper plate 211.

In the expansion joint 210 according to the embodiment of the present invention, according to a principle of measuring an axle weight, a distance between axles, and a speed of a vehicle, as shown in FIG. 8, the manager terminal has a database (DB) of information on the number of axles, a distance between axles, a vehicle weight, and a total weight of a vehicle which received a vehicle type approval, determines a vehicle speed and the distance between axles thereof from a time difference of a measurement signal measured by the load cells, and accurately determines an axle weight of the vehicle by comparing vehicle information stored in the DB with the measured axle weight.

The measuring device 230 is positioned at a predetermined position of the bridge 100 and measures behavior of the bridge when the traveling vehicle 300 passes over the first expansion joint 210. For example, the measuring device 230 may include at least one of an accelerometer, a deformeter, a displacement gauge, and a crackmeter.

The manager terminal 240 includes a program capable of analyzing behavior of the bridge 100 according to a load loaded thereon, checks an overweight of the traveling vehicle 300, and inspects safety of the bridge.

Also, as shown in FIG. 7 which will be described below, the overweight vehicle check device 250 may check an overweight of the traveling vehicle 300 when the traveling vehicle 300 is overweight by the manager terminal 240.

Also, in the safety inspection apparatus 200 for a bridge using an expansion joint with a load cell, at least one first expansion joint 210 is installed on the bridge 100, and thus the load cells 220 measure an axle weight when the traveling vehicle 300 moves in a bridge axis direction and may indirectly calculate the axle weight, a distance between axles, and a vehicle speed of the traveling vehicle 300 based on a difference of load measuring time. The manager terminal 240 has an algorithm and a program that calculate the axle weight, the distance between axles, and the vehicle speed of the traveling vehicle 300 based on a loading time difference of the traveling vehicle 300.

Thus, when the traveling vehicle 300 passing over the first expansion joint 210 with the load cell 220 is heavy, the safety inspection apparatus 200 for a bridge using an expansion joint with a load cell according to the first embodiment of the present invention estimates data of the vehicle based on the axle weight, the distance between axles, and the vehicle speed of the heavy vehicle, measures behavior of the bridge 100 when the traveling vehicle 300 is loaded thereon in real time, and may recognize whether the bridge 100 is damaged based on the measured result.

FIG. 7 is a view showing a detailed configuration of a manger terminal of the safety inspection apparatus for a bridge using an expansion joint with a load cell according to the first embodiment of the present invention, and FIG. 8 is a view showing examples of vehicle type data applied to the safety inspection apparatus for a bridge using an expansion joint with a load cell according to the first embodiment of the present invention.

Referring to FIG. 7, in the safety inspection apparatus for a bridge using an expansion joint with a load cell according to the first embodiment of the present invention, the manager terminal 240 includes a data collector 241, a data processing and analyzing unit 242, a bridge information DB 243, an overweight determination unit 244, a vehicle information DB 245, and a safety inspection unit 246.

The data collector 241 collects data measured by the load cell 220 and the measuring device 230 through wired or wireless communication.

The data processing and analyzing unit 242 calculates an axle weight, a distance between axles, and a vehicle speed according to the data measured by the load cell 220 of the data collected by the data collector 241 and calculates bridge response performance according to the data measured by the measuring device 230.

The overweight determination unit 244 determines whether the traveling vehicle 300 is overweight by comparing the axle weight, the distance between axles, and the vehicle speed calculated by the data processing and analyzing unit 242 with the data stored in advance and measures whether the axle weight and a total weight of the traveling vehicle 300 calculated by the data processing and analyzing unit 242 exceed an allowance reference.

The vehicle information DB 245 is a database configured to store vehicle information such as information on a vehicle class, information on a vehicle type, and information on a vehicle body and axle arrangement. As shown in FIG. 8, the vehicle information DB 245 distinguishes a passenger vehicle, a mini truck, a bus, a small cargo vehicle, and a large cargo vehicle and is configured to store vehicle information on an axle arrangement (two, three rows and the like) and vehicle body for each of the vehicle types, and thus the data processing and analyzing unit 242 may determine the traveling vehicle 300 traveling on the bridge 100 by comparing the vehicle information stored in the vehicle information DB 245 with the measurement data of the load cell 220 generated when the traveling vehicle 300 drives on the bridge 100.

The safety inspection unit 246 may perform safety inspection of the bridge 100 in real time by setting a determination result of the overweight determination unit 244 and the bridge response performance calculated by the data processing and analyzing unit 242 and in the bridge information DB 243 by measurement item in advance and comparing the determination result and the bridge response performance with the stored behavior threshold value.

Also, when the overweight determination unit 244 determines whether the axle weight and the total weight of the traveling vehicle 300 exceeds the allowance reference, the overweight vehicle check device 250 recognizes a vehicle number to transmit information on an overweight vehicle to a corresponding agency through wireless or wired communication. For example, the overweight vehicle check device 250 may include a camera, a display, and a communication module installed at a predetermined height of the bridge 100.

Second Embodiment: Safety Inspection Apparatus for a Bridge Using an Expansion Joint with a Load Cell FIG. 9 is a side view of the safety inspection apparatus for a bridge using an expansion joint with a load cell according to the second embodiment of the present invention, and FIG. 10 is a plan view of the safety inspection apparatus for a bridge using an expansion joint with a load cell according to the second embodiment of the present invention.

Figure 9:
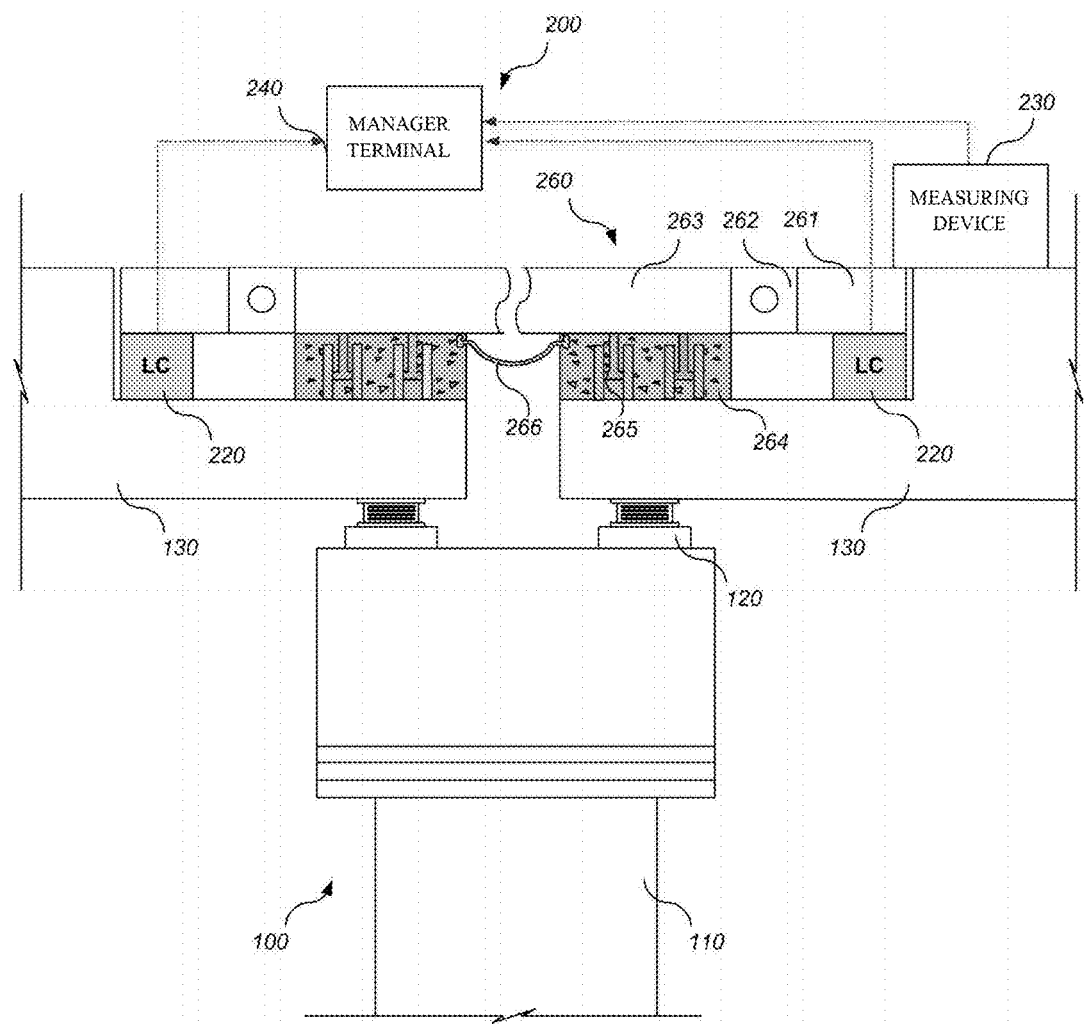
FIG. 9 is a side view of a safety inspection apparatus for a bridge using an expansion joint with a load cell according to a second embodiment of the present invention.
Figure 10:
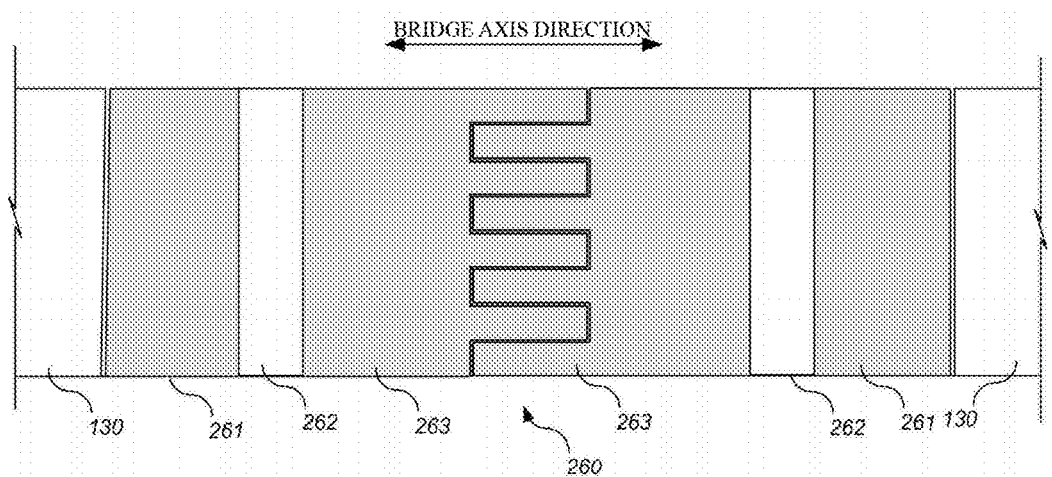
FIG. 10 is a plan view of the safety inspection apparatus for a bridge using an expansion joint with a load cell according to the second embodiment of the present invention.

Referring to FIGS. 9 and 10, the safety inspection apparatus for a bridge using an expansion joint with a load cell according to the second embodiment of the present invention includes a second expansion joint 260, a load cell 220, a measuring device 230, and a manager terminal 240, and may also include an overweight vehicle check device 250.

When compared to the safety inspection apparatus for a bridge using an expansion joint with a load cell according to the first embodiment of the present invention, the safety inspection apparatus for a bridge using an expansion joint with a load cell according to the second embodiment of the present invention is practically the same as the safety inspection apparatus for a bridge using an expansion joint with a load cell according to the first embodiment of the present invention except for a structure of the second expansion joint 260 and a position of the load cell 220 installed in the second expansion joint 260, and thus detailed descriptions of overlapping parts will be omitted. That is, in the case of the safety inspection apparatus for a bridge using an expansion joint with a load cell according to the second embodiment of the present invention, the second expansion joint 260 mounted with the load cell 220 may be installed in a post-casting part for an expansion joint.

As shown in FIGS. 9 and 10, the second expansion joint 260 includes a machine part-upper plate 261, a hinge 262, a rail-type expansion joint-upper plate 263, post-casting part concrete 264, an embedded anchor 265, and a waterproofing plate 266, but is not limited thereto.

The second expansion joints 260 is mainly classified into a machine part and a post-casting part, and is installed at a beginning and an end of the bridge 100, for example, between the abutment 110 and the bridge upper plate 130 or between the bridge upper plates 130, the load cells 220 are installed at a lower portion of the second expansion joints 260. In this case, the machine part includes the machine part-upper plate 261, the hinge 262, and the rail-type expansion joint-upper plate 263, and the post-casting part includes the post-casting part concrete 264 and the embedded anchor 265.

In this case, the rail-type expansion joint-upper plate 263 has one side connected to the machine part-upper plate 261 by a rotatable hinge 262, and a lower portion of the rail-type expansion joint-upper plate 263 is connected to the embedded anchor 265 embedded in the post-casting part concrete 264.

One side of the machine part-upper plate 261 is connected to a rotatable hinge 262, and the other side is formed as a free end. In this case, each of the load cells 220 is provided or installed at a lower end of the free end, and the machine part-upper plate 261 and the rail-type expansion joint-upper plate 263 are formed of a steel material. When the traveling vehicle 300 is placed on the machine part-upper plate 261, each of the load cells 220 measures an axle weight of the traveling vehicle 300 in real time.

Thus, the safety inspection apparatus 200 for a bridge using an expansion joint with a load cell according to the embodiment of the present invention can check an overweight of a traveling vehicle and inspect safety of a bridge by including a load cell which measures a load of a traveling vehicle installed at a lower portion of an expansion joint installed between upper plates of the bridge, and a measurement device installed at the bridge to measure behavior of the bridge.

[Safety Inspection Method of a Bridge Using an Expansion Joint with a Load Cell]

Figure 11:
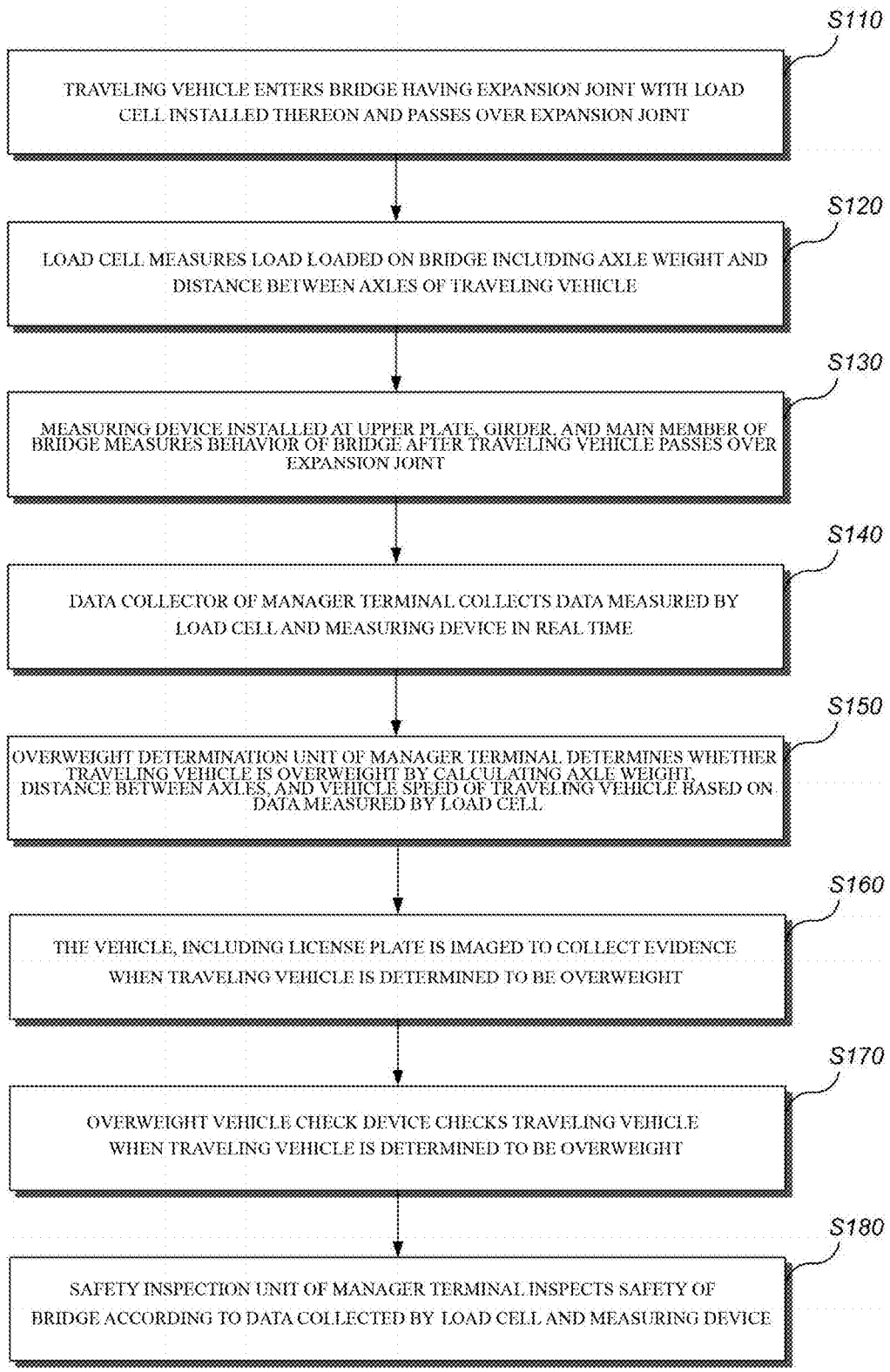
FIG. 11 is an operation flowchart illustrating a safety inspection method for a bridge using an expansion joint with a load cell according to one embodiment of the present invention.

FIG. 11 is an operation flowchart showing the safety inspection apparatus for a bridge using an expansion joint with a load cell according to the embodiment of the present invention.

Referring to FIGS. 5, 7 and 11, the safety inspection method of a bridge using an expansion joint with a load cell according to the embodiment of the present invention is as follows. The traveling vehicle 300 enters the bridge 100 having an expansion joint with the load cell 220 installed thereon and passes over the expansion joint (S100). In this case, as described above, the expansion joint may be the first expansion joint 210 or the second expansion joint 260.

The load cell 220 measures a load loaded thereon and including an axle weight and distance between axles of the traveling vehicle 300 (S120).

After the traveling vehicle 300 passes over the expansion joint 210, the measuring device 230 installed at a predetermined position, such as an upper plate, a girder, and a main member of the bridge 100, measures behavior of the bridge 100 (S130).

The data collector 241 of the manager terminal 240 collects data measured by the load cell 220 and the measuring device 230 in real time (S140).

The overweight determination unit 244 of the manager terminal 240 determines whether the traveling vehicle 300 is overweight by calculating the axle weight, the distance between axles, and a vehicle speed of the traveling vehicle 300 based on the data measured by the load cell 220 and comparing the axle weight, the distance between axles, and the vehicle speed of the traveling vehicle 300 with vehicle DB information stored in the manager terminal 240 (S150).

When the traveling vehicle 300 is determined to be overweight, the vehicle, including a license plate, is imaged to collect evidence (S160).

When the traveling vehicle 300 is determined to be overweight, the overweight vehicle check device 250 checks the traveling vehicle (S170). In this case, the overweight vehicle check device 250 is installed at a predetermined position of the bridge 100 and checks an overweight of bridge 100 when the manager terminal 240 determines that the traveling vehicle 300 is overweight based on the data measured by the load cell 220, and, for example, the overweight vehicle check device 250 may include a camera, a display, and a communication module installed at a predetermined position of the bridge 100 but is not limited thereto.

The safety inspection unit 246 of the manager terminal 240 inspects safety of the bridge 100 in real time according to the data collected by the load cell 220 and the measuring device 230 (S180). The safety inspection unit 246 stores a measurement threshold value of the measurement device and a measurement item preset by a manager through structural analysis for the safety inspection and warns the manager of a bridge safety problem in real time when the measurement is compared with the threshold in real time and the measurement exceeds the threshold. Also, the safety inspection unit 246 may recognize whether the bridge is damaged by comparing and analyzing values of behavior data, particularly, a load, a displacement, and a strain rate value, accumulated over the long term. In this case, the measuring device 230 includes at least one of an accelerometer, a deformeter, a displacement gauge, or a crackmeter, and is installed at a predetermined position of the bridge 100 to determine the behavior of the bridge 100.

According to an embodiment of the present invention, a total weight of a vehicle can be automatically recognized without a separated measurement to manage traveling of an overweight vehicle (a vehicle exceeding a load limit) which hinders safety of a structure and road pavement, and thus manpower and a budget can be reduced, and safety of the road pavement and structure can be ensured. Also, weight data of a vehicle passing over the bridge is measured and stored in real time as behavior data of the bridge based on a load of the bridge, and a damaged position, a degree of deterioration, and performance of a bridge can be easily determined without a safety inspection by analyzing the data over the long term, thereby improving bridge safety management.

According to the present invention, a safety inspection apparatus for a bridge using an expansion joint with a load cell can perform a safety inspection of a bridge and check an overweight of a traveling vehicle by including a load cell installed at a lower portion of an expansion joint installed between upper plates of a bridge to measure a load of a traveling vehicle, and a measuring device installed on a bridge to measure behavior of the bridge.

According to the present invention, a safety inspection apparatus for a bridge using an expansion joint with a load cell can automatically recognize a total weight of a vehicle without a separate measurement to manage an operation of an overweight vehicle (a vehicle exceeding a load limit) which hinders safety of road pavement and a structure.

According to the present invention, a safety inspection apparatus for a bridge using an expansion joint with a load cell can measure and store weight data of a vehicle actually passing over a bridge as behavior data of a bridge in real time and can easily determine performance, a degree of deterioration, and a damaged position of the bridge without a separate safety inspection by analyzing the data over the long term, and improve safety management of a bridge.

The above description is only exemplary, and it should be understood by those skilled in the art that the invention may be performed in other concrete forms without changing the technological scope and essential features. Therefore, the above-described embodiments should be considered only as examples in all aspects and not for purposes of limitation. For example, each component described as a single component may be realized in a distributed manner, and similarly, components that are described as being distributed may be realized in a coupled manner.

The scope of the present invention is defined not by the detailed description but by the appended claims, and encompasses all modifications or alterations derived from meanings, the scope, and equivalents of the appended claims.

What is claimed is:

1. A safety inspection apparatus for a bridge using an expansion joint with a load cell, the apparatus comprising:
    an expansion joint (210) including a machine part and a post-casting part installed in an expansion section between upper plates of a bridge (100), wherein a machine part-upper plate (211) of the machine part has one side connected with an embedded anchor (214) embedded in post-casting part concrete (213) of the post-casting part by a rotatable hinge (212), and the other side formed as a free end;
    at least one load cell (220) provided at a lower end of the free end of the machine part-upper plate (211) and configured to measure an axle weight and a total weight of a traveling vehicle (300) when the traveling vehicle (300) is placed on the machine part-upper plate (211);
    at least one measuring device (230) installed at the bridge (100) and configured to measure behavior of the bridge (100) when the traveling vehicle (300) passes over the expansion joint (210);
    a manager terminal (240) including a program to analyze the behavior of the bridge (100) according to a load and configured to check an overweight of the traveling vehicle (300) and inspect safety of the bridge; and
    an image capturing device for checking an overweight configured to capture an image of the traveling vehicle (300) to check whether the traveling vehicle (300) is overweight.

2. The apparatus of claim 1, further comprising an overweight vehicle check device (250) installed at the bridge (100) and configured to check the overweight of the traveling vehicle (300) when the traveling vehicle (300) is determined to be overweight based on data measured by the load cell (220).

3. The apparatus of claim 1, wherein the manager terminal (240) includes:
    a data collector (241) which collects data measured by the load cell (220) and the measuring device (230) of the data collected by the data collector (241);
    a data processing and analyzing unit (242) configured to calculate an axle weight, a distance between axles, and a vehicle speed based on the data measured by the load cell (220) and calculate bridge response performance according to the data measured by the measuring device (230);
    an overweight determination unit (244) configured to determine whether the traveling vehicle (300) is overweight by comparing the axle weight, the distance between axles, and the vehicle speed calculated by the data processing and analyzing unit (242) with data stored in a vehicle information DB (245) in advance and determine whether the axle weight and the total weight of the traveling vehicle (300) calculated by the data processing and analyzing unit (242) exceeds an allowance; and
    a safety inspection unit (246) configured to inspect safety of the bridge (100) by setting the bridge response performance calculated by the data processing and analyzing unit (242) and a determination result of the overweight determination unit (244) in a bridge information database (243) by measurement items in advance and comparing the bridge response performance and the determination result with an installed behavior threshold value.

4. The apparatus of claim 1, wherein:
    at least one expansion joint (210) is installed at the bridge (100);
    adjacent load cells (220) are configured to repeatedly measure the axle weight and indirectly calculate the axle weight, a distance between axles, and the vehicle speed of the traveling vehicle (300) based on a difference of times at which loads are measured when the traveling vehicle (300) moves in a bridge axis direction; and
    the manager terminal (240) is configured to calculate the axle weight, the distance between axles, and the vehicle speed of the traveling vehicle (300) according to the load time difference of the traveling vehicle (300).

5. The apparatus of claim 1, wherein the apparatus is configured to, when the traveling vehicle (300) passing over the expansion joint (210) is heavy, estimate data of the vehicle based on an axle weight, a distance between axles, and a vehicle speed of a heavy vehicle, measure the behavior of the bridge (100) in real time when the traveling vehicle (300) is loaded thereon, and inspect safety of the bridge (100) based on the measured result.

6. A safety inspection apparatus for a bridge using an expansion joint with a load cell, the apparatus comprising:
    an expansion joint (260) including a machine part and a post-casting part installed in an expansion joint section between upper plates of a bridge (100), wherein a rail-type expansion joint-upper plate (263) of the machine part has one side connected to a machine part-upper plate (261) by a rotatable hinge (262) and a lower portion connected with an embedded anchor (265) embedded in post-casting part concrete (264) of a post-casting part, and the machine part-upper plate (261) has one side connected to the rotatable hinge (262) and the other side formed as a free end;
    at least one load cell (220) provided at a lower end of the free end of the machine part-upper plate (261) and configured to measure an axle weight and a total weight of a traveling vehicle (300) when the traveling vehicle (300) is on the machine part-upper plate (261);

at least one measuring device (230) installed at the bridge (100) and configured to measure behavior of the bridge (100) when the traveling vehicle (300) passes over the expansion joint (260);

a manager terminal (240) including a program to analyze the behavior of the bridge (100) according to a load and configured to check an overweight of the traveling vehicle (300) and inspect safety of the bridge; and an image capturing device for checking an overweight configured to capture an image of the traveling vehicle (300) to check whether the traveling vehicle (300) is overweight.

7. The apparatus of claim 6, further comprising an overweight vehicle check device (250) installed at the bridge (100) and configured to check the overweight of the traveling vehicle (300) when the traveling vehicle (300) is determined to be overweight based on the data measured by the load cell (220).

8. A safety inspection method of a bridge using an expansion joint with a load cell, the method comprising:
   a) an operation of allowing a traveling vehicle (300) to enter a bridge (100) with expansion joints (210 and 260) at which a load cell (220) is installed and to pass over the expansion joints (210 and 260);
   b) an operation of measuring, by the load cell (220), a load loaded on the load cell and including an axle weight and a distance between axles of the traveling vehicle (300);
   c) an operation of measuring, by a measuring device (230) installed at the bridge (100), behavior of the bridge (100) after the traveling vehicle (330) passes over the expansion joints (210 and 260);
   d) an operation of collecting, by a data collector (241) of a manger terminal (240), data measured by the load cell (220) and the measuring device (230);
   e) an operation of determining, by an overweight determination unit (244) of the manager terminal (240), whether the traveling vehicle (300) is overweight by comparing the data determined by the load cell (220) with vehicle database information stored in the manager terminal (240);
   f) an operation of capturing an image of the vehicle including a license plate of the vehicle to collect evidence when the vehicle is determined to be overweight; and
   g) an operation of inspecting, by the safety inspecting unit (246) of the manager terminal (240), safety of the bridge (100) according to the data collected by the load cell (220) and the measuring device (230) in real time,
   wherein the manger terminal (240) includes a program to analyze the behavior of the bridge (100) according to a load and is configured to check an overweight of the traveling vehicle (300) and inspect safety of the bridge.

9. The method of claim 8, wherein when the load cell (220) measures a load of the traveling vehicle (300) loaded on the bridge in operation (b), an axle weight, the distance between axles, and a vehicle speed of the traveling vehicle (300) are calculated and compared with the vehicle database information stored in the manager terminal (240) to determine whether the traveling vehicle (300) is overweight in operation (c).

10. The method of claim 8, wherein when the traveling vehicle (300) is determined to be overweight by the overweight determination unit (244) of the manager terminal (240) in operation (f), an overweight vehicle check device (250) inspects the traveling vehicle.

11. The method of claim 8, wherein:
   at least one of the expansion joints (210 and 260) is installed on the bridge (100);
   when the traveling vehicle (300) moves in a bridge axis direction, adjacent load cells (220) arc configured to repeatedly measure the axle weight and indirectly calculate the axle weight, the distance between axles, and the vehicle speed of the traveling vehicle (300) based on a difference of times at which loads are measured; and
   the manager terminal (240) calculates the axle weight, the distance between axles, and the vehicle speed of the traveling vehicle (300) according to a load difference of the traveling vehicle (300).

12. The method of claim 8, wherein:
   when the traveling vehicle (300) passing over the expansion joint (210) is heavy, data of the vehicle is estimated based on the axle weight, the distance between axles, and the vehicle speed of the heavy vehicle; and
   when the traveling vehicle (300) is placed on the bridge, the behavior of the bridge (100) is measured in real time, and safety of the bridge (100) is inspected using the measured result.

* * * * *